May 10, 1938.  C. L. HILL  2,116,629
AUTOMATIC STEERING MECHANISM
Filed March 25, 1935  3 Sheets-Sheet 1

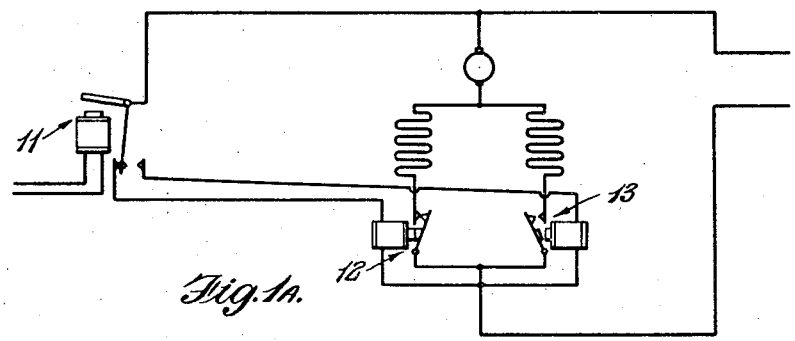

Fig. 1A.

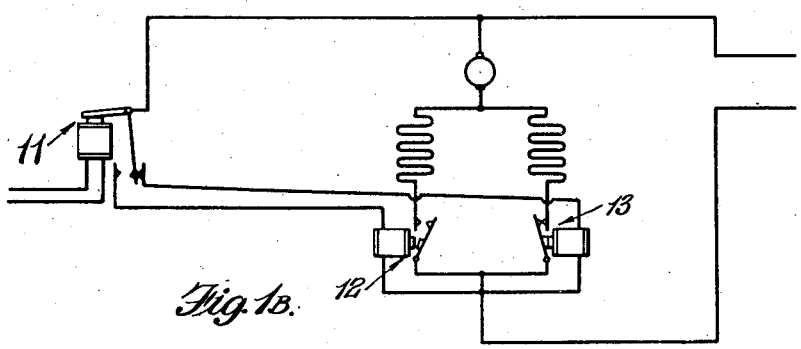

Fig. 1B.

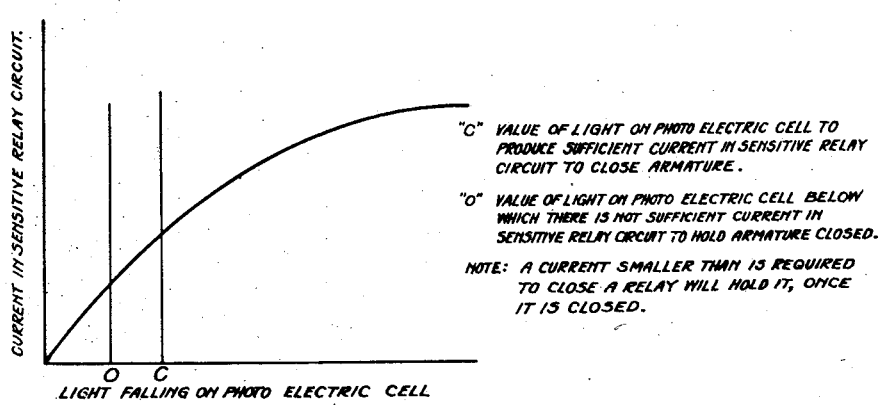

Fig. 2.

"C" VALUE OF LIGHT ON PHOTO ELECTRIC CELL TO PRODUCE SUFFICIENT CURRENT IN SENSITIVE RELAY CIRCUIT TO CLOSE ARMATURE.

"O" VALUE OF LIGHT ON PHOTO ELECTRIC CELL BELOW WHICH THERE IS NOT SUFFICIENT CURRENT IN SENSITIVE RELAY CIRCUIT TO HOLD ARMATURE CLOSED.

NOTE: A CURRENT SMALLER THAN IS REQUIRED TO CLOSE A RELAY WILL HOLD IT, ONCE IT IS CLOSED.

INVENTOR
C. L. Hill.
BY Munson H. Lane.
ATTORNEY

May 10, 1938.                C. L. HILL                2,116,629
AUTOMATIC STEERING MECHANISM
Filed March 25, 1935                3 Sheets-Sheet 3

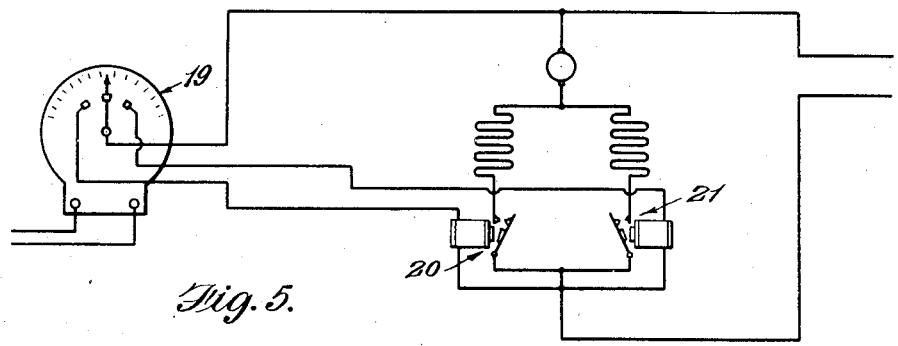

Fig. 5.

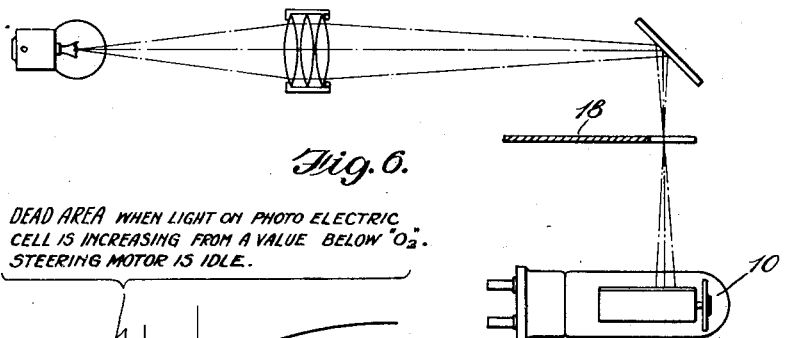

Fig. 6.

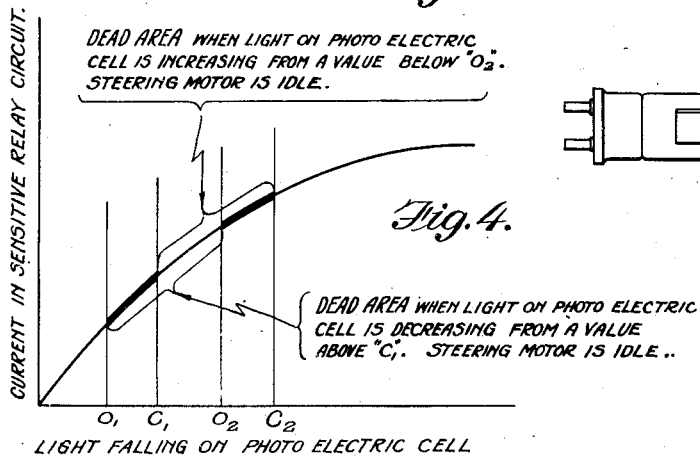

Fig. 4.

"$C_1$" VALUE OF LIGHT ON PHOTO ELECTRIC CELL TO PRODUCE SUFFICIENT CURRENT IN SENSITIVE RELAY CIRCUIT TO CLOSE ARMATURE OF SENSITIVE RELAY NO. 1.

"$O_1$" VALUE OF LIGHT ON PHOTO ELECTRIC CELL BELOW WHICH THERE IS NOT SUFFICIENT CURRENT IN THE SENSITIVE RELAY CIRCUIT TO HOLD ARMATURE OF SENSITIVE RELAY NO. 1. CLOSED.

"$C_2$" VALUE OF LIGHT ON PHOTO ELECTRIC CELL TO PRODUCE SUFFICIENT CURRENT IN SENSITIVE RELAY CIRCUIT TO CLOSE ARMATURE OF SENSITIVE RELAY NO. 2.

"$O_2$" VALUE OF LIGHT ON PHOTO ELECTRIC CELL BELOW WHICH THERE IS NOT SUFFICIENT CURRENT IN THE SENSITIVE RELAY CIRCUIT TO HOLD ARMATURE OF SENSITIVE RELAY NO. 2. CLOSED.

NOTE: A CURRENT SMALLER THAN IS REQUIRED TO CLOSE A RELAY WILL HOLD IT, ONCE IT IS CLOSED.

INVENTOR
C. L. Hill,
BY
Munson H. Lane
ATTORNEY

Patented May 10, 1938

2,116,629

UNITED STATES PATENT OFFICE 2,116,629

AUTOMATIC STEERING MECHANISM

Curtiss L. Hill, Tacoma, Wash., assignor of one-half to R. Clayton McRae, Tacoma, Wash.

Application March 25, 1935, Serial No. 13,001

2 Claims. (Cl. 172—282)

This invention relates to improvements in automatic steering mechanism for ships or other dirigible bodies governed by rudders, and particularly those which include the use of a photo-electric cell. Certain details of construction are illustrated in my prior Patent No. 1,885,098, granted October 25, 1932, and in my application Serial No. 591,686, filed February 8, 1932.

One feature of the present invention consists in reversing the motor according as the light cast on the photo-electric cell, and consequently the current in the cell circuit, is relatively weak or strong, instead of reversing the motor as light or a shadow is cast on the cell. Between the higher and lower ranges of current which respectively operate the motor in one direction or the other there is a neutral zone in which the current generated in the circuit of the photo-electric cell, or the amplified current from said cell, is too weak to set the controls of the rudder-operating motor in position to operate the rudder in one direction and too strong to set them to operate it in the other.

Another feature of my invention resides in the use of two relays requiring currents differing in strength to operate them. The relays may be either in series or in parallel.

These relays are governed by a photo-electric cell according to the amount of light cast thereon, which causes one, both, or neither of the relay armatures to close. When neither is closed, current traverses the motor in one direction, when both are closed, current through the motor is in the opposite direction, and when only one is closed, there is no current through the motor.

In this respect my invention differs from my prior inventions, making use of two relays in series instead of a single relay, which latter causes the motor to be always in action, whether its armature is open or closed. Of course, these relations of relays to motor circuits may be altered at will.

Another feature of my invention resides in keeping the cell normally energized, instead of being alternately energized and de-energized. I use a broader band of light than in my prior inventions, whereby the edge of the compass card may cut off a portion of the band of greater or less cross-section.

In the drawings,

Fig. 1—A is a diagram of a circuit arrangement which is shown in order to better illustrate the advantages of my invention;

Fig. 1—B is an illustration of the same arrangement with the parts in a different position;

Fig. 2 is a graphical illustration showing the relation of the sensitive relay current and the light on the photo-electric cell in Figs. 1—A and 1—B;

Fig. 3—A is a diagrammatic view of my invention;

Fig. 3—B and Fig. 3—C show the same parts in different positions;

Fig. 4 shows the relation of the current in the sensitive relay of the form shown in Figs. 3—A, 3—B and 3—C to the light of the photo-electric cell;

Fig. 5 is a view of a modification of my invention, and

Fig. 6 illustrates diagrammatically the light and the photo-electric cell together with intermediate parts.

Figure 3A:
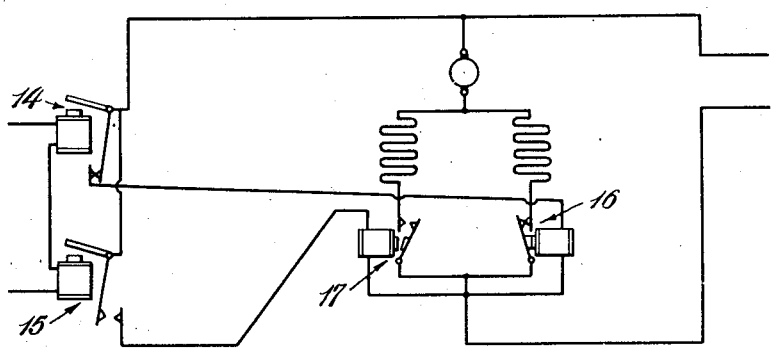

In a form of automatic steering apparatus now in use, the steering motor is in operation continuously, and while the degree of steering is excellent, there is considerable wear and tear on the equipment due to this continuous action of the various parts.

To fully appreciate the value of this improvement, the operation of the old form of apparatus must first be understood. The curve in Fig. 2 shows the relation between the light falling on the photo-electric cell 10, Fig. 6, and the current in the sensitive relay circuit shown in the diagrams of Figs. 1—A and 1—B. If the operation of the device is analyzed, starting at an instant when there is no light falling on the photo-electric cell, it will be noted that at this point there is no current flowing in the sensitive relay circuit. Its armature will be open (out), and Fig. 1—A will represent the position of the contacts of the sensitive relay 11. This relay is in reality a single pole double throw switch, closing one motor relay 12 when its armature is open and the other 13 when the armature is closed. Thus when the sensitive relay armature is open, the motor relay contact 12 is closed, and the motor operates in such a direction as to increase the light falling on the photo-electric cell and give the rudder motion in the proper direction to correct the course of the ship. As the light increases on the photo-electric cell, it finally reaches the value (shown at O, curve Fig. 2) which produces sufficient current in the sensitive relay circuit to close the armature of this relay. The current rises to a maximum C (curve Fig. 2). The instant the armature closes, the circuit to the motor relay 12 is broken and that to motor relay 13 is made. (Fig. 1—B). This reverses the direction of the steering motor. The motor is now running in the direction to decrease the light falling on the photo-electric cell and give the rudder motion in the proper direction to correct the course of the ship. As the light on the cell decreases, it passes the minimum value that can produce sufficient current in the relay circuit to hold the armature closed, and consequently the armature drops open. When this opens, the circuit conditions are the same as they were before (shown in Fig. 1—A) and the cycle is repeated.

When and as long as the ship is on its course, this operation becomes a series of continual reversals, only running in one direction long enough to again reverse itself. This "hunting action" only produces a relatively small motion on the steering wheel, not large enough to actually move the rudder. The disadvantage of the action, however, is that the whole equipment is overworked and the wear and tear on the various relays, motor and control is excessive when actually there should be no operation of the elements at all.

One of the purposes of the improved method of steering is to provide a neutral point in the operation so that when the ship is on its true course there will be no operation of the various elements. This method can best be understood by referring to Figs. 3—A, 3—B and 3—C, and the curve in Fig. 4. Comparing Figs. 1—A and 1—B with Figs. 3—A, 3—B and 3—C, it will be noted that the single pole double throw switch 11 (the sensitive relay) has been replaced by two single pole single throw switches 14 and 15 (two sensitive relays). These two latter relays each control an individual motor relay 16 and 17 respectively.

Figure 3B:
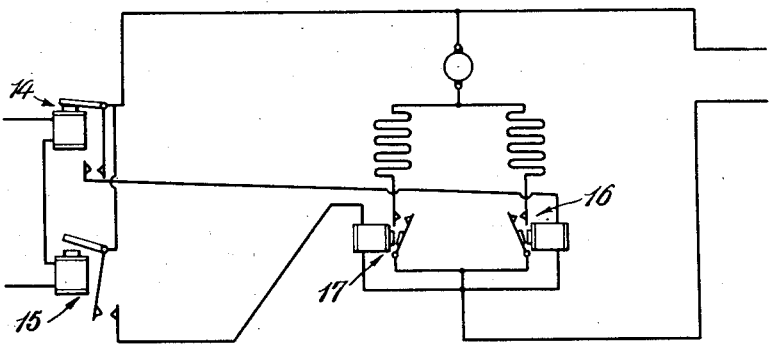
Figure 3C:
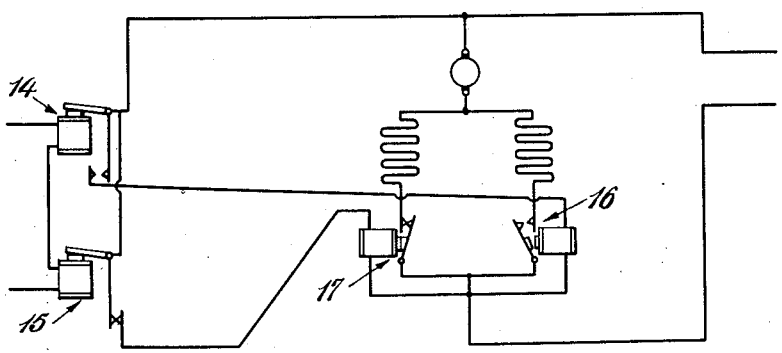

As in the previous analysis, consider an instant when there is no light falling on the photo-electric cell. Referring to Fig. 4 with its notations, it will be seen that both relay armatures are open when there is no current flowing in the sensitive relay circuits or windings. Fig. 3—A represents the conditions at this instant. From this it will be seen that when the armature of sensitive relay 14 is open, motor relay 16 is closed, causing the steering motor to run in such a direction as to increase the amount of light falling on the photo-electric cell. As the quantity of light reaches the value $C_1$ (Fig. 4), the armature of the sensitive relay 14 is closed, thereby breaking the circuit to motor relay 16 and stopping the motor. These circuit conditions are represented by Fig. 3—B. As long as the quantity of light on the photo-electric cell does not increase beyond that represented by $C_2$, nor decrease below the value $O_1$, the motor will be idle. With the proper adjustments of these two relays, this idle band represents the limits of the course on which the ship is to be kept, and as long as it is on this particular course, the steering motor will be idle.

The two sensitive relays are identical in construction, the adjustment of the current value at which each closes being obtained by adjusting the air gap between the armature and the coil core or the spring tension of the armature or both. In actual practice, relay 14 closes at about 1¼ milliamperes and drops out at 1 milliampere. Sensitive relay 15 closes at about 3½ milliamperes and drops out at 3 milliamperes. With full light on the photo-electric cell, about 6 milliamperes flow through the relay windings, thereby giving an ample factor of safety for satisfactory operation. The neutral point between the operation of the two relays is in the order of a degree on the compass. The width of this idle band may be adjusted from a small fraction of a degree to several by simply narrowing or widening the light beam where it passes the cut-away edge of the compass card 18 (Fig. 6). This in effect changes the slope of the curve shown in Fig. 4, and thereby makes it necessary for the compass bowl to move more or less with respect to the compass card before the two relays are operated.

To study further the action of the two relays, consider the condition where the ship is gradually swinging off its course. This change in the course varies the amount of light falling on the photo-electric cell, and it will soon reach a value represented by either $O_1$ or $C_2$. First consider that it has reached the value $C_2$. This is sufficient to cause the sensitive relay current to close the armature on sensitive relay 15. When the armature closes, the contact to motor relay 17 closes and the motor is put in operation (Fig. 3—C). The direction of this operation is such that the light falling on the photo-electric cell is decreased and at the same time the rudder is moved so as to bring the ship back to its course. As soon as the light on the photo-electric cell has decreased to a value less than that represented by $O_2$, the armature of the sensitive relay 15 opens and the motor stops. Again the conditions are as represented in Fig. 3—B with the ship on its course and the motor idle.

Consider now that the ship swings off its course in the opposite direction so that the light falling on the photo-electric cell is decreasing. As soon as the light reaches a value less than $O_1$, the armature of sensitive relay 14 opens. This causes motor relay 16 to close and the steering motor is operated in such a direction as to increase the light on the cell, and the rudder is moved in the proper direction to bring the ship back to its course (Fig. 3—A). The light soon reaches the value $C_1$, and the armature of sensitive relay 14 closes, thereby opening the motor relay 16 and stopping the motor. The ship is now back on its course and the steering motor is idle.

Theoretically the same results as the above may be accomplished by substituting for the two sensitive relays a current measuring device 19, Fig. 5, having contacts thereon arranged in such a manner that when a certain maximum current value is reached, one motor relay 20 is actuated, and when a minimum value is reached, the other motor relay 21 is actuated. There would then be a value of current for which there would be no operation of the steering motor. In actual practice, however, this method is not as satisfactory as that above outlined, since with the former method the steering motor would be operated in a series of short jerks, inasmuch as the instant a contact was made, the current in the motor would be changed by the change in light on the photo-electric cell, thereby stopping the motor. It must be noted that with the use of two relays, the current in them must be changed an appreciable amount before the motor will be stopped. This is very important, since usually this amount of movement of the rudder is enough to make a correction in the course, and one rudder application of this nature would do the same work as many smaller ones. The saving of wear and tear on the equipment is obvious.

The characteristics of the usual type of sensitive relay are such that a slightly higher current value in the winding is necessary to close the relay armature than that at which it will open. This difference in current is due to the fact that when the armature is close to the coil core, the air gap is less, and consequently the amount of current required to hold it closed is less.

In all of the foregoing no reference was made to electrical equipment between the photo-electric cell and the sensitive relay windings. This may be any of the many conventional methods of amplifying the small current flowing through the photo-electric cell to a value sufficient to operate a sensitive relay. In the case of the Western "Photronic" cell, the cell itself generates sufficient current to actuate a meter or even a very sensitive relay. The above improved method of automatic steering may be applied to any form of photo-electric cell.

To prove the practical value of this improved method of steering, a set embodying these improvements has been tested out under actual service conditions. This set was so constructed that either the old method could be used or the improved method. In order to eliminate the effect of varying weather or tide conditions during the test, the two methods were used alternately for five minute periods for one hour. Using the old method whereby the steering motor was continuously operated, the motor was actuated an average of 29 times a minute. With the improved method, the operations were reduced to 8⅕ times for the same period, with no change in the quality of steering. A further test was made of the time the motor was in operation with the improved method, and it was found that the motor was in operation only 37 per cent of the time. This is to be compared with continuous operation in the old method. At the end of a 14-hour run with the new method, the steering motor was absolutely cold, while heretofore the motor had been running up to its rated temperature rise. This gives some comparative idea of the duty on the motor.

A specific embodiment of the invention has been described in detail for the purpose of illustrating the inventive thought involved, but it will be understood that the invention is not to be limited to the details herein described, which may be modified or varied as will be apparent to those skilled in the art.

What I claim is:

1. In a ship steering device, a single photo-electric cell, a source of light, a compass card arranged to permit the light from said source to fall on the cell in varying degrees according to the position of the card relative to the light and cell, a single circuit controlled by said varying light, a reversible motor controlled by said circuit, and means for driving the motor in one direction when an insufficient amount of light falls on the cell and in the opposite direction when a relatively large amount falls thereon, the motor being inoperative when an intermediate amount falls thereon, and a steering rudder operated by said motor, said compass card including adjacent zones, one of which cuts off light entirely and the other permits of its passage to the cell, and the beam of light being sufficiently broad to at times overlap a substantial portion of the zones, during which period the motor is inoperative.

2. In a ship steering device, a single photo-electric cell, a source of light, a compass card having an edge arranged to permit the light from said source to fall on the cell in varying degrees according to the position of the card relative to the light and cell, the beam of light from said source having substantial breadth in the plane of the card so that the edge of the compass card may cut off a portion of the beam of greater or less cross sectional area according to the relative position of the card, a single circuit controlled by said varying light, a reversible motor controlled by said circuit, and means for driving the motor in one direction when an insufficient amount of light falls on the cell and in the opposite direction when a relatively large amount falls thereon, the motor being inoperative when an intermediate amount falls thereon, and a steering rudder operated by said motor.

CURTISS L. HILL.